US005246789A

United States Patent [19]

Itani et al.

[11] Patent Number: 5,246,789

[45] Date of Patent: Sep. 21, 1993

[54] AC POWDER TYPE EL PANEL AND METHOD OF MANUFACTURING THE SAME

[75] Inventors: Takaharu Itani, Yokohama; Masaru Nikaido, Miura; Hideki Yamaguchi, Yokohama, all of Japan

[73] Assignee: Kabushiki Kaisha Toshiba, Kawasaki, Japan

[21] Appl. No.: 822,673

[22] Filed: Jan. 21, 1992

Related U.S. Application Data

[62] Division of Ser. No. 572,560, Aug. 27, 1990, Pat. No. 5,085,605.

[30] Foreign Application Priority Data

Aug. 28, 1989 [JP] Japan .................... 1-218516
May 30, 1990 [JP] Japan .................... 2-138335

[51] Int. Cl.$^5$ .................... B32B 9/00
[52] U.S. Cl. .................... 428/913; 428/690
[58] Field of Search .................... 428/913, 690

[56] References Cited

U.S. PATENT DOCUMENTS 4,767,679 8/1988 Kawachi .................... 428/690
5,107,175 4/1992 Hirano et al. .................... 428/690

*Primary Examiner*—Patrick J. Ryan
*Assistant Examiner*—Cathy Lee
*Attorney, Agent, or Firm*—Cushman, Darby & Cushman

[57] ABSTRACT

An AC powder type EL panel includes an AC powder type EL element, thermoplastic adhesive layers formed on all surfaces of the AC powder type EL element, and a pair of protective films adhered to cover substantially the entire surfaces of the thermoplastic adhesive layers and having end portions to be fused to each other to seal the AC powder type EL element. A thickness ratio of the protective film to the thermoplastic adhesive layer is within the range of 5:1 to 2:1. Since the thermocompression-bonded end portions of the thermoplastic adhesive layers having poor moisture barrier properties are not exposed between the protective films at the end portions of the AC powder type EL panel, penetration of external moisture into the panel can be effectively prevented.

5 Claims, 5 Drawing Sheets

AC POWDER TYPE EL PANEL AND METHOD OF MANUFACTURING THE SAME

This is a division of application Ser. No. 07/572,560, filed Aug. 27, 1990, now U.S. Pat. No. 5,085,605.

BACKGROUND OF THE INVENTION

1. Field of the Invention

The present invention relates to an AC powder type EL panel to be used as, e.g., a back light of a liquid crystal display device, an illumination light source, and a display element and a method of manufacturing the same.

2. Description of the Related Art

FIGS. 1A and 2 show the structure of a conventional AC powder type EL panel. FIG. 1A is a sectional views perpendicular to a light-emitting surface of the AC powder type EL panel, and FIG. 2 is a plan view showing the AC powder type EL panel viewed from the above the light-emitting surface. Referring to FIG. 1A, a reflective insulating layer 2 is formed on a backplate 1 consisting of an aluminum foil or the like, a light-emitting layer 3 is formed on the reflective insulating layer 2, and a transparent conductive film 4 is bonded by thermocompression on the light-emitting layer 3. The transparent conductive film 4 is constituted by a resin film 4*b* as a substrate consisting of, e.g., polyester and a transparent electrode 4*a* formed on the resin film 4*b*. The transparent film 4 is bonded by thermocompression on the light-emitting layer 3 so that the transparent electrode 4*a* faces down, thereby constituting the AC powder type EL element. The AC powder type EL panel is constituted by the AC powder type EL element as described above, a pair of moisture-trapping films 5 formed on the upper and lower surfaces of the AC powder type EL element and consisting of, e.g., nylon, thermoplastic adhesive layers 6*b* formed on the upper and lower surfaces of the moisture-trapping films 5, and a pair of protective films 6*a* having good moisture barrier properties and bonded by thermocompression from the above and below the pair of moisture-trapping films 5 via the thermoplastic adhesive layers 6*b* to seal the AC powder type EL panel.

As shown in FIG. 2, as the transparent electrode, a transparent conductive film 4 obtained by forming a thin film of a transparent electrode layer 4*a* on a resin film substrate 4*b*, and coating a silver paste of a bar-shape on the resulting thin film and baking it to form an auxiliary electrode 4*c*, can be used. Leads 7 consisting of phosphor bronze or aluminum a normally, externally led from the backplate 1 and the auxiliary electrode 4*a* formed on the conductive film 4.

With the above arrangement, light emission can be obtained from the EL light-emitting element by applying an AC electric field having about 100 V and 100 to 1,000 Hz across the leads 7. In this state, however, the light-emitting layer 3 absorbs moisture to deteriorate the phosphor. Therefore, a method of manufacturing this AC powder type EL element additionally requires a step of forming the protective films 6*a* as polymer films having good moisture barrier properties to seal the element and a step of forming the moisture-trapping layers 5 for trapping moisture permeating through the protective films 6*a*.

As the moisture-trapping layers 5, a pair of moisture-trapping films 5 having good moisture absorption characteristics such as nylon resin films are formed outside the AC powder type EL element. An adhesive is coated on one surface of each nylon resin film 5, and the films 5 are bonded to the AC powder type EL element by thermocompression by a laminator with the AC powder type E element being sandwiched between the films 5 such that the adhesive faces inside.

As the protective films 6*a*, films having good moisture barrier properties and small moisture permeability such as fluoroplastic films are used. The protective film 6*a* has a size larger than that of the AC powder type EL element. The thermoplastic adhesive layer 6*b* is coated on one surface of each protective film 6*a*. The protective films 6*a* are bonded by thermocompression to sandwich the AC powder type EL element such that the adhesive faces inside. The AC powder type EL panel has a structure in which portions of the protective films 6*a* extending from the AC powder type EL elements are bonded by thermocompression to each other by a laminator, thereby sealing the elements.

A laminator used in thermocompression bonding of the protective films 6*a* and the thermoplastic adhesive layers 6*b* is constituted by at least a pair of heat rollers having an internal heater. Sealing of the AC powder type EL elements are performed as follows. That is, a plurality of AC powder type EL elements are aligned between two opposing elongated protective films such that distal end portions of their lead extend from the protective films, and the two protective films are bonded by thermocompression to each other. The upper and lower protective films and the thermoplastic adhesive layers integrated by sealing are cut into a predetermined size by a press cut method, thereby manufacturing an AC powder type EL panel.

The A powder type EL panel obtained by the above manufacturing method, however, has a problem of uneven deterioration of a light-emitting layer caused by penetration of moisture from a peripheral portion of the laminated protective film. When this uneven deterioration occurs, a distribution of brightness of the AC powder type EL panel is significantly deteriorated within a short time period. Therefore, when the AC powder type EL panel having the uneven deterioration is used as a back light of a liquid crystal display, it is difficult to read displayed characters.

The uneven deterioration of the light-emitting layer is mainly caused by penetration of moisture from the thermoplastic adhesive layers formed on the protective films. As described above, the protective films are bonded by thermocompression from the above and below the AC powder type EL elements via the thermoplastic adhesive layers to seal the elements and cut into a predetermined shape by a press cut method or the like. This cut surface is shown in an enlarged scale in FIG. 1B. As shown in FIG. 1B, the thermoplastic adhesive layers are exposed to the cut surface between the upper and lower protective films. External moisture permeates the exposed thermoplastic adhesive layers and penetrates into the panel. The light-emitting layer at the peripheral portion of the light-emitting surface is rapidly deteriorated by the penetrating moisture to cause uneven deterioration of the light-emitting surface. Therefore, a strong demand has arisen for development of an AC powder type EL panel which improves moisture barrier properties of the protective films and the thermoplastic adhesive layers to prevent uneven deterioration of the light-emitting layers.

As described above, according to a conventional AC powder type EL panel obtained by vertically sandwiching AC powder type EL elements by protective films having a larger size than that of the elements via thermoplastic adhesive layers, performing thermocompression bonding to seal the AC powder type EL elements by a laminator, and cutting the protective films and the thermoplastic adhesive layers into a predetermined size, if cutting of the protective films and the thermoplastic adhesive layers is performed by a press cut method, the thermoplastic adhesive layers between the thermocompression-bonded protective films are exposed to the cut surface. Therefore, moisture outside the panel penetrates into the panel through the thermoplastic adhesive layers to cause uneven deterioration in the light-emitting layer from the peripheral portion of the light-emitting surface.

SUMMARY OF THE INVENTION

It is an object of the present invention to provide an AC powder type EL panel which solves a problem of uneven deterioration in a light-emitting layer caused by moisture penetrating into the panel.

It is another object of the present invention to provide a method of manufacturing an AC powder type EL panel.

An AC powder type EL panel of the present invention comprises:

an AC powder type EL element including a transparent first electrode, a reflective insulating layer formed on the first electrode, a light-emitting layer formed on the reflective insulating layer, a second electrode provided on the light-emitting layer, and a pair of leads connected to the first and second electrodes a thermoplastic adhesive layer formed on substantially the entire surfaces of the AC powder EL element; and a pair of protective films adhered to cover substantially the entire surface of the thermoplastic adhesive layer and having end portions to be fused to each other to seal the AC powder type EL element.

A thickness ratio of the protective film to the thermoplastic adhesive layer may be within the range of 5:1 to 2:1.

According to the present invention, a pair of protective films having good moisture barrier properties are integrally fused at their end portions to seal the AC powder type EL element and the thermoplastic adhesive layers. In the AC powder type EL panel of the present invention, therefore, since the thermocompression-bonded end portions of the thermoplastic adhesive layers having poor moisture barrier properties ar not exposed between a pair of protective films at the end portion of the AC powder type EL panel, penetration of external moisture into the panel can be effectively prevented.

A method of manufacturing an AC powder type EL panel of the present invention comprises the steps of:

forming a reflective insulating layer on a first electrode;

forming a light-emitting layer on the reflective insulating layer;

providing a second electrode on the light-emitting layer;

connecting leads from the first and second electrodes to obtain an AC powder type EL element;

forming thermoplastic adhesive layers on a pair of protective films having a size larger than that of the first and second electrodes;

bonding one protective film to upper surface of said AC powder type EL element and the other protective film to lower surface of said AC powder type EL element by thermocompression from the above and below by the protective films to seal the AC powder type EL element; and cutting the end portions of the thermocompression-bonded protective films into a predetermined shape by using a laser, thus fusing the end portions of said protecting layers, wherein a thickness ratio of the protective film to the thermoplastic adhesive layer falls within the range of 5:1 to 2:1.

According to the method of the present invention, thermocompression bonding is performed by limiting the ratio of the thickness of the protective film to that of the thermoplastic resin layer, and the thermocompression-bonded protective films are cut by using a laser. Therefore, since the protective films having good moisture barrier properties are integrally fused at the cut surfaces of the protective films, the thermoplastic adhesive layers having poor moisture barrier properties can be sealed into the protective films. In the AC powder type EL panel manufactured in this manner, the thermoplastic resin layers are not exposed to the cut surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENT

Figure 3A:
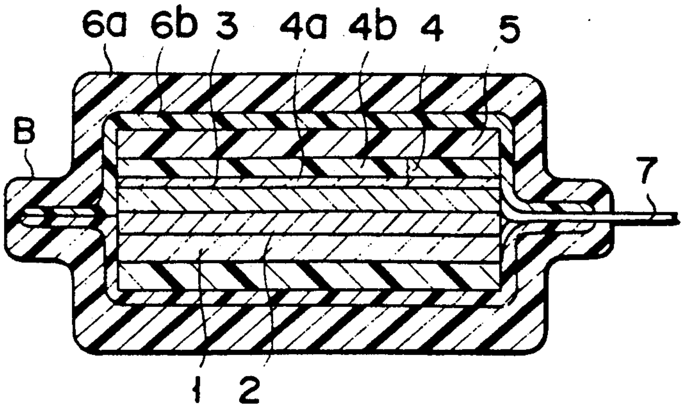
FIG. 3A is a sectional view showing an AC powder type EL panel according to an embodiment of the present invention viewed in a direction perpendicular to a light-emitting surface.

A preferred embodiment of the present invention will be described below with reference to the accompanying drawings. FIG. 3A is a sectional view showing an AC powder type EL panel according to one embodiment of the present invention. Referring to FIG. 3A, a reflective insulating layer is formed on a first electrode 1, a light-emitting layer 3 is formed on the reflective insulating layer 2, a second electrode 4 is formed on the reflective insulating layer 3, and leads are led from both the electrodes 1 and 4, thereby constituting the AC powder type EL element.

As a material of the first electrode 1, aluminum, copper, or nickel, for example, can be used.

As a material of the second electrode 4, indium oxide or ITO, for example, can be used.

As a phosphor for use in the light-emitting layer 2, a conventional EL lamp phosphor can be used. Examples of the phosphor are ZnS:Cu,Cl, ZnS:Cu,I, and ZnS:Cu,Mn,Cl.

Thermoplastic resin layers **6*b* and a pair of protective films adhered on the thermoplastic resin layers 6*b*** are formed on the surfaces of the AC powder type EL element described above. The end portions of the pair of protective films are fused to each other to seal the AC powder type EL element. A ratio of the thickness of the protective film to that of the thermoplastic adhesive layer is limited to within the range of 5:1 to 2:1. Although this thickness ratio varies in accordance with the types of protective film and thermoplastic adhesive, it is preferably within the range of 4:1 to 3:1.

Since the end portion of the AC powder type EL panel having the above arrangement is airtightly covered with a molten product of the protective films **6*a*, the thermoplastic adhesive layers 6*b*** having poor moisture barrier properties are not exposed between the protective films at the end portion of the AC powder type EL panel. Therefore, penetration of external moisture into the panel can be effectively prevented.

Examples of the material of the protective film used in the present invention are polychlorotrifluoroethylene (to be referred to as PCTFE hereinafter), a combination of polyethylene terephthalate (PET) and butyl rubber, and a combination of high-density polyethylene and PET. The material of the film, however, is not limited to these examples as long as the film is transparent and has low water permeability and good moisture barrier properties. Although the thickness of the protective film is not particularly limited, it is 100 to 300 μm, and preferably, 150 to 200 μm in consideration of processability, cost, permeability, and moisture barrier properties.

The thermoplastic adhesive used in the present invention is a polymer layer which can be adhered upon heating or pressurization, e.g., an olefin resin, an acrylic resin, a vinyl acetate resin, and polyester.

In the AC powder type EL panel, moisture-trapping layers 5 can be formed between the EL light-emitting element and the thermoplastic adhesive layers. Examples of the moisture-trapping layer of the present invention are films consisting of nylon 6, or nylon 6,6 having thermoplastic resin layers on one side of the films. A method of manufacturing the AC powder type EL panel shown in FIG. 3A will be described below. The reflective insulating layer 2, the light-emitting layer 3, and the second electrode 4 are sequentially formed on the first electrode 1, and the leads are formed to be led from both the electrodes 1 and 4, thereby manufacturing the AC powder type EL element. The manufactured AC powder type EL element is sandwiched between a pair of moisture-trapping films having thermoplastic resin layers, and the moisture-trapping films are bonded by thermocompression to the AC power type EL element. The AC power type EL element which is sandwiched between a pair of moisture-trapping films is sandwiched between a pair of protective films having thermoplastic resin layers having the size larger than that of the EL element, and the protective films are bonded by thermocompression to seal the AC powder type EL element. An AC powder type EL panel can be obtained by cutting the end portions of the thermocompression-bonded protective films **6*b*** into a predetermined shape by using a laser.

In a thermocompression bonding step, a heating temperature is preferably 80° C. to 170° C., and more preferably, 100° C. to 150° C., and a linear pressure is preferably 4 to 48 kg/cm, and more preferably, 5 to 40 kg/cm.

In formation of the reflective insulating layer and the light-emitting layer on the backplate, a binder prepared by dissolving an organic high dielectric such as cyanoethylprulan or cyanoethylpolyvinylalcohol into an organic solvent such as N,N-dimethylformamide can be used. The reflective insulating layer can be formed by coating a reflective insulating material paste prepared by dispersing a white powder having a high dielectric constant such as barium titanate into the binder, on the back plate using doctor roll method or screen printing method and heating and drying the reflective insulating material paste. The light-emitting layer can be formed following the same procedures as for the reflective insulating layer except that a phosphor such as ZnS:Cu,Cl is dispersed in the binder to prepare a light-emitting material paste and this light-emitting material paste is used in place of the reflective insulating material paste. In this manner, the reflective insulating layer and the light-emitting layer are sequentially formed on the backplate.

As the transparent electrode on the light-emitting layer, a thin film as a transparent electrode layer consisting of, e.g., ITO or indium oxide can be formed on a resin film substrate consisting of, e.g., polyester or polyethylene terephthalate by sputtering or vapor deposition. In addition, a transparent conductive film obtained by coating and baking a silver paste in the form of a bar on the resulting thin film to form an auxiliary electrode can be used. This transparent conductive film can be overlapped and bonded by thermocompression with the transparent and auxiliary electrodes facing down. Leads consisting of, e.g., phosphor bronze or aluminum can be externally led from the backplate 1 and the auxiliary electrode on the conductive film.

The thermoplastic adhesive can be formed on the protective film in the form of a layer. Examples of a method of forming the thermoplastic adhesive layer on the protective film are a method of dissolving a thermoplastic adhesive component in an organic solvent and coating the resultant solution and a method of melting and extrusion-laminating a thermoplastic adhesive component.

A step of sealing the AC powder type EL element by bonding the protective films and the thermoplastic adhesive layers to element by thermocompression is generally performed by using a laminator. A laminator is generally constituted by a pair of heat rolls having an internal infrared heater or a pair of induction-heating type heat rolls. Two films having the thermoplastic adhesive layers on the protective films are opposed each other such that the thermoplastic adhesive layers are arranged inside, the AC powder type EL element is sandwiched between the two opposing films, and the two films are fed between rotating heat rolls. The thermoplastic adhesive layers are heated and pressurized between the heat rolls to fuse the thermoplastic adhesive layers so that the AC powder type EL element is sealed by the protective films and the thermoplastic adhesive layers. In order to produce a pressure between the heat rolls, a force is generally applied on both end portions of the roll by two cylindrical hydraulic or pneumatic cylinders. A linear pressure P between the two heat rolls to be applied on the AC powder type EL element is defined by the following equation (1):

$$P\,(kg/cm)=2\cdot\pi\cdot D^2\cdot P_0/L/4 \quad (1)$$

D: cylinder inner diameter (cm)

$P_0$: cylinder pressure ($kg/cm^2$)

L: AC powder type EL element width (cm)

Figure 1A:
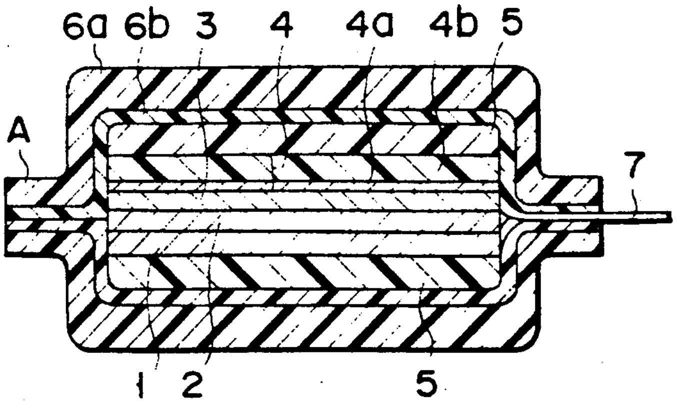
FIG. 1A is a sectional view showing a conventional AC powder type EL panel.
Figure 1B:
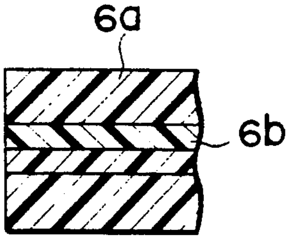
FIG. 1B is an enlarged sectional view showing an end portion A shown in FIG. 1A.
Figure 2:
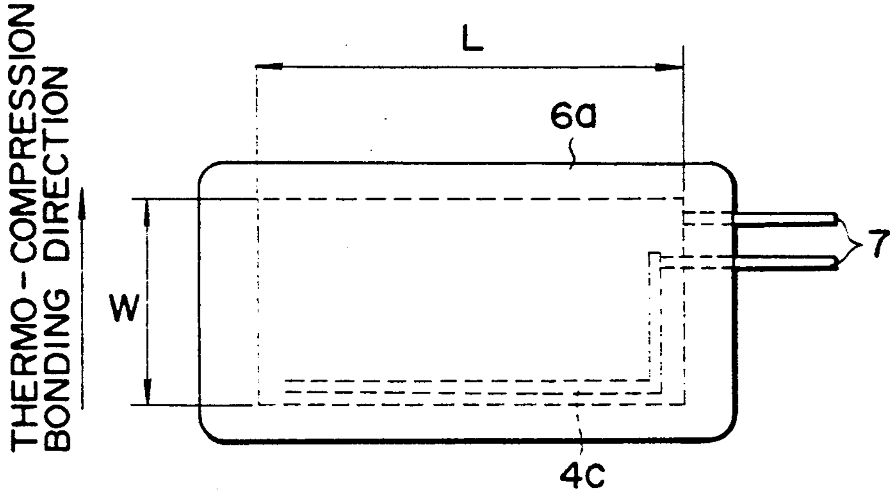
FIG. 2 is a perspective view showing the AC powder type EL panel viewed from the light-emitting surface side.

Sealing of the AC powder type EL element by the protective films is generally performed by applying the linear pressure and the heat defined as described above on the AC powder type EL element. If, however, an AC powder type panel having a comparatively small light-emitting area, sealing can be performed by uniformly applying a pressure and heat on the entire surface of the AC powder type EL element by using a hot press in consideration of a production efficiency and manufacturing cost. In this case, a pressure P′ required for sealing is defined by the following equation (2) assuming that the pressure is applied on the surface to be pressed by using N cylinders. Note that a thermocompression bonding direction, a width L, and a length W are shown in FIG. 2:

$$P'\,(kg/cm^2)=N\cdot\pi\cdot D^2\cdot P_0/L/W/4 \quad (2)$$

D: cylinder inner diameter (cm)

$P_0$: Cylinder pressure ($kg/cm^2$)

L: AC powder type EL element width (cm)

W: AC powder type EL element length (cm)

N: Number of cylinder

In the present invention, since P is limited to 5 (kg/cm)$\leqq$P$\leqq$40 (kg/cm), the pressure P′ is represented by the following equation (3):

$$(5\cdot N)/(2\cdot W)\,(kg/cm^2)\leqq P'\leqq(40\cdot N)/(2\cdot W)(kg/cm^2)$$

Therefore, by performing the thermocompression bonding step by setting N, W, and P′ to satisfy the above equation (3), the effect of the present invention can be obtained regardless of a linear pressure.

Examples of a laser used in the present invention are a carbon dioxide gas laser and an excimer laser. The type of laser, however, is not limited to these examples as long as the laser can cut the films but does not cut the metal.

In the AC powder type EL panel of the present invention, when the AC powder type EL element is to be sealed by the protective films via the thermoplastic adhesive layers, a ratio of the thickness of the protective film to that of the thermoplastic adhesive layer falls within the range of 5:1 to 2:1. After the protective films are bonded by thermocompression to seal the element, the protective films are melted and cut by using a laser to airtightly cover peripheral portions of the thermoplastic adhesive layers by a molten product of the protective films. As a result, a moisture vapor resistance of the protective films can be significantly improved. Therefore, an AC powder type EL panel which does not cause uneven deterioration even after it is used over a long time period.

The present invention will be described in more detail below by way of its examples.

EXAMPLES 1-3

A reflective insulating layer paste prepared by dispersing a barium titanate powder in a binder solution in which cyanoethylprulan and cyanoethyl polyvinylalcohol in N,N-dimethylformamide (to be referred to as DMF hereinafter) was coated on a backplate 1 consisting of an aluminum foil by a screen printing method. Thereafter, the coated reflective insulating layer paste was dried at 120° C. to remove DMF, thereby forming a reflective insulating layer 2 having a thickness of 30 to 40 μm.

A light-emitting layer paste prepared by dispersing a ZnS:Cu,Cl phosphor and an organic fluorescent pigment in the above binder solution was coated on the reflective insulating layer 2. Thereafter, the coated light-emitting layer paste was dried at 120° C. to remove DMF, thereby forming a light-emitting layer 3 having a thickness of 30 to 40 μm.

A transparent conductive film 4 was formed by depositing ITO as a transparent electrode 4*a* on a PET film 4*b*. A thermosetting silver paste was printed on the transparent electrode 4*a* by a screen printing method. Thereafter, the printed silver paste was baked and thermoset at 150° C. for 30 minutes to form an auxiliary electrode 4*c* on the transparent conductive film 4. Leads 7 consisting of phosphor bronze were temporarily fixed by a PET tape at predetermined positions of the auxiliary electrode 4*c* and the backplate 1.

The transparent electrode 4*a* and the light-emitting layer 3 were bonded by using a laminator at a heating temperature of 170° C., a linear pressure of 20 to 40 kg/cm, a feed speed of 10 to 50 cm/min. In addition, moisture-trapping films 5 constituted by a nylon 6 film and a thermoplastic adhesive adhered on the nylon 6 film was bonded to the outer surfaces of the transparent electrode 4*a* and the backplate 1 by using a laminator at a heating temperature of 130° C., a linear pressure of 20 to 30 kg/cm, and a feed speed of 30 to 50 cm/min.

Films obtained by forming thermoplastic adhesive layers 6*b* on protective films 6*a* consisting of PCTFE were bonded by thermocompression on the outer surfaces of the moisture-trapping films 5 by using a laminator at a heating temperature of 130° C., a linear pressure of 20 kg/cm, and a feed speed of 30 cm/min. while the thickness ratio of the protective film to the thermoplastic adhesive was changed to be 5:1, 4:1, and 2:1, thereby sealing an AC powder type EL element. Thereafter, the projecting protective films were cut by a carbon dioxide gas laser to obtain AC powder type EL panels, and the characteristics of the panels were compared and evaluated. Practical processing conditions for cutting the protective films and the thermoplastic adhesive layers by using a carbon dioxide gas laser are summarized in the following Table.

TABLE

| | |
|---|---|
| Carbon Dioxide Gas Laser Output | 17.5 W |
| Lens-Sample Interval | 90.0 mm |
| Assist Gas | Ar |
| Assist Gas Supply Amount | 20.0 l/min. |
| Cutting Speed | 20.0 m/sec. |

As Controls 1 to 3, panels were manufactured following the same procedures as in Examples 1 to 3 except that the thickness ratio of the protective film to the thermoplastic adhesive were changed to 8:1, 6:1, and 1:1. In addition, Controls 4 to 10 were manufactured following the same procedures as in Examples 1 to 3 except that the thickness ratio was changed to be 8:1, 6:1, 5:1, 4:1, 2:1, and 1:1 and cutting was performed by a press cut method.

Figure 3B:
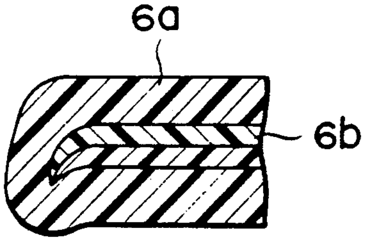
FIG. 3B is an enlarged sectional view showing an end portion B shown in FIG. 3A.
Figure 4:
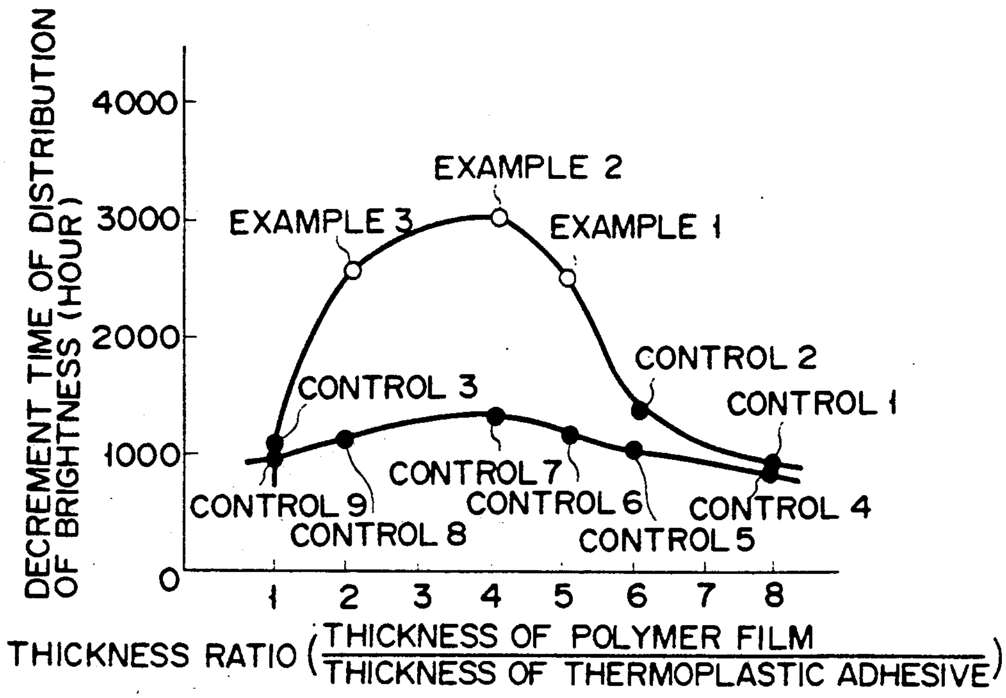
FIG. 4 is a graph showing a change in decrement time of distribution of brightness with respect to a ratio of the thickness of a protective film to that of a thermoplastic adhesive layer.
Figure 5:
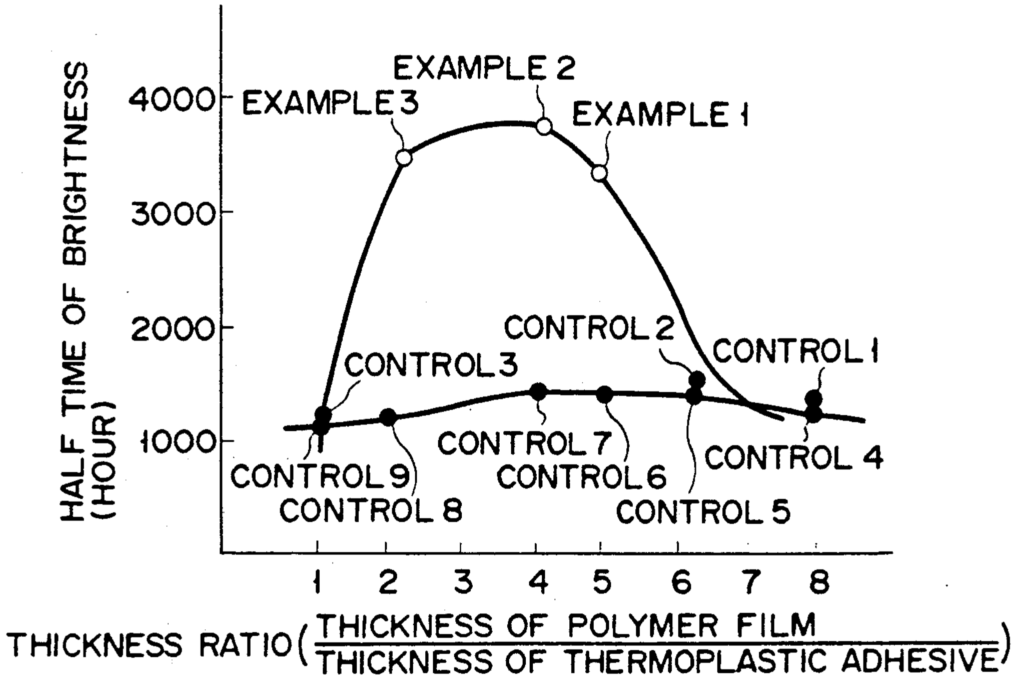
FIG. 5 is a graph showing change in half life of brightness with respect to a ratio of the thickness of a protective film to that of a thermoplastic adhesive layer.

The thickness of the protective film was set to be 200/μm in all the examples. Half life of brightness as brightness of the AC powder type EL panel and decrement time of distribution of brightness as its distribution of brightness were measured for each AC powder type EL panels of the present invention and the controls. FIGS. 4 and 5 are a graph showing a relationship between the distribution of brightness and a thickness ratio of the protective film to the thermoplastic adhesive layer and a relationship between the half life of brightness and the thickness ratio, respectively, according to the measurement results of the distribution of brightness and the decrement time of distribution of brightness obtained at room temperature of 25° C. and a relative humidity of 60% when an AC voltage of 100 V and 400 Hz was applied. Distribution of brightness was defined as a value obtained by dividing maximum brightness of the light-emitting surface by its minimum brightness, and the decrement time of distribution of brightness is defined as a light emission time required for the distribution of brightness to exceed 1.2. As is apparent from FIG. 3, the AC powder type EL panels having the thickness ratio of the protective film to the thermoplastic adhesive layer falling within the range of 5:1 to 2:1 has good decrement time of distribution of brightness exceeding 3,000 hours, while the distributions of brightness of the AC powder type EL panels of other conditions were rapidly degraded as a time passed. To contrary to this, the decrement time of distribution of brightness of each control was 1,000 hours regardless of the thickness ratio. As is apparent from FIG. 5, the half time of brightness indicating the life of panel of each AC powder type EL panel having the thickness ratio according to the present invention wa three to four times those of the controls.

The similar experiment was conducted by changing the laminating conditions of sealing such that the heating temperature of 100° C. to 150° C. and the linear pressure of 5 to 40 kg/cm. As a result, the brightness and the distribution of brightness were significantly improved when the thickness ratio of the protective film to the thermoplastic adhesive layer fell within the range of 5:1 to 2:1 as compared with other ranges. In addition, it was found that this effect appeared regardless of the feed speed upon thermocompression bonding.

The above effect can be obtained when the thickness ratio of the protective film to the thermoplastic adhesive layer falls within the range of 5:1 to 2:1 for the following reason. That is, if the thickness ratio is smaller than 2:1, since an amount of the melted protective films is absolutely insufficient during laser cutting, the thermoplastic adhesive layers cannot be covered. If the thickness ratio is larger than 5:1, since the melted protective films sag downward by a gravitational force, the thermoplastic adhesive layers are exposed to the cut surface. If, however, the thickness ratio falls within the range of 5:1 to 2:1, since the melted protective films air-tightly cover the thermoplastic adhesive layers upon laser cutting, no thermoplastic adhesive layers are exposed to the cut surface to prevent penetration of moisture into the AC powder type EL panel.

EXAMPLES 4–27

AC powder type EL panels were manufactured by cutting protective films and thermoplastic adhesive layers by using a carbon dioxide gas laser following the same procedures as in Example 1 except that a protective film is of 200-μm thick and a thermoplastic adhesive layer is of 50-μm thick and thermocompression bonding was performed under various conditions, and decrement time of distribution of brightness and half life of brightness were measured following the same procedures as in the above experiment.

Figure 6:
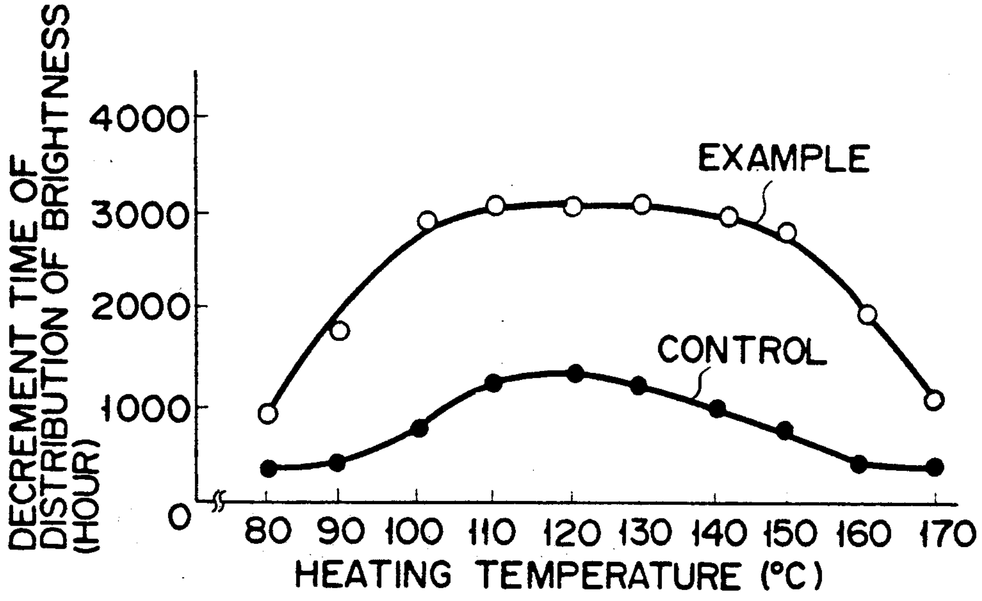
FIG. 6 is a graph showing a change in decrement time of distribution of brightness with respect to a heating temperature.
Figure 7:
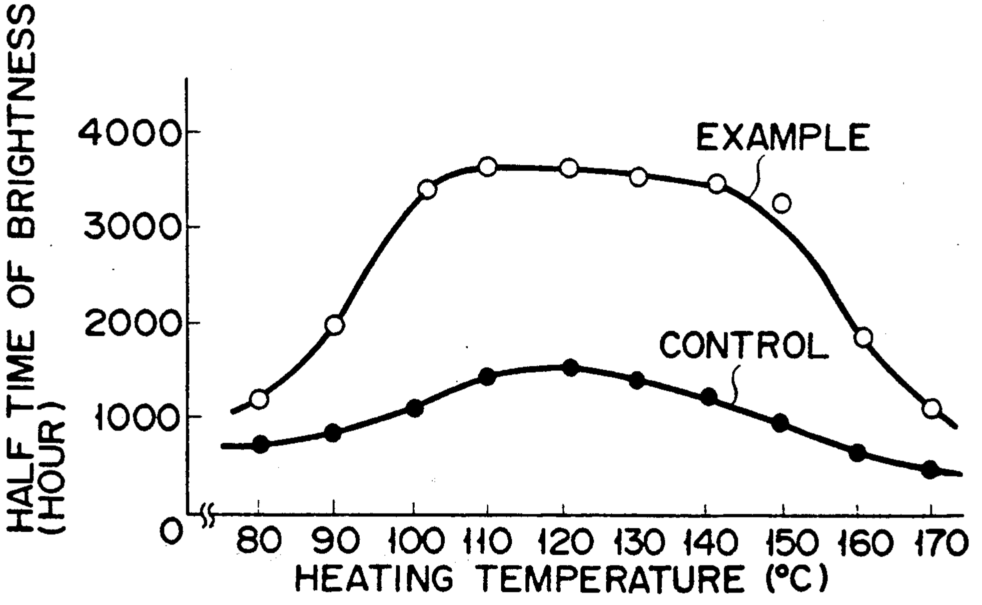
FIG. 7 is a graph showing a change in half life of brightness with respect to a heating temperature.

FIGS. 6 and 7 are graphs showing a relationship between the decrement time of distribution of brightness and a heating temperature upon thermocompression bonding and a relationship between the half life of brightness and the heating temperature of the AC powder type EL panels obtained by thermocompression bonding at various heating temperatures under the conditions of a linear pressure of 25 kg/cm and a feed speed of 30 cm/min. as Examples 4 to 13 and Controls 10 to 19. As is apparent from FIGS. 6 and 7, good decrement time of distribution of brightness and half life of brightness of 3,000 and 3,500 hours, respectively, were obtained within the heating temperature range of 100° C. to 150° C.

Figure 8:
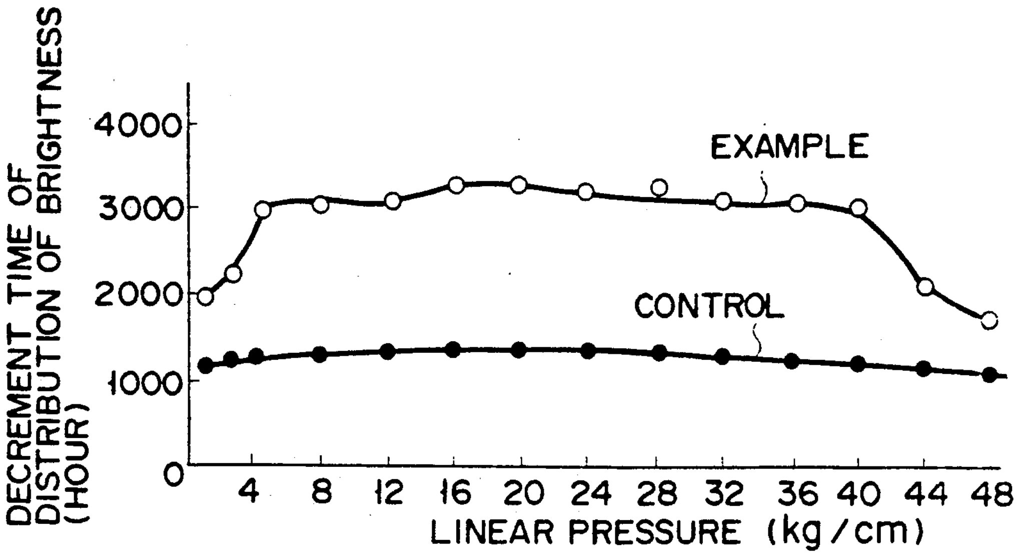
FIG. 8 is a graph showing a change in decrement time of distribution of brightness with respect to a linear pressure and FIG. 9 is a graph showing a change in half life of brightness with respect to a linear pressure.
Figure 9:
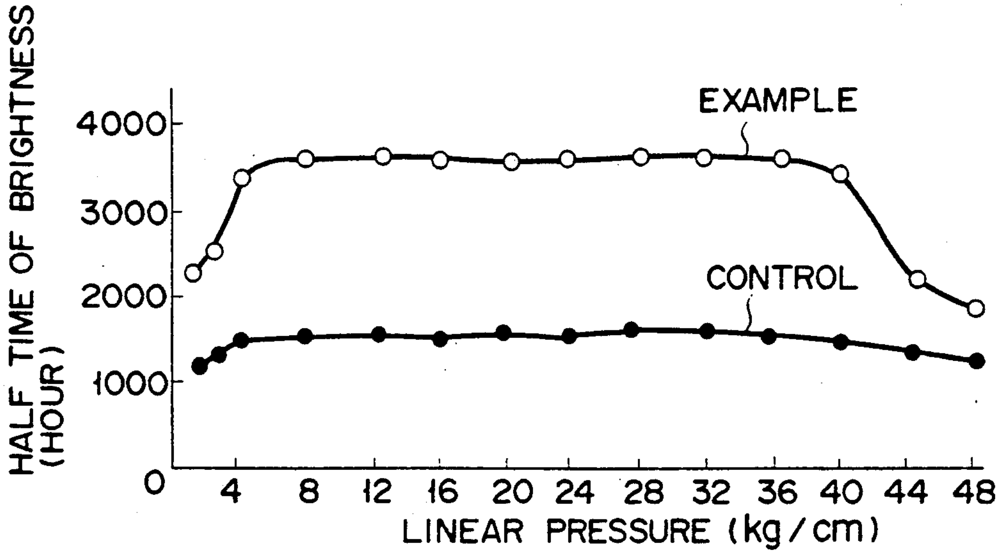

FIGS. 8 and 9 are graphs showing a relationship between decrement time of distribution of brightness and a linear pressure and a relationship between half life of distribution and the linear pressure of AC powder type EL panels manufactured by cutting the protective films and the thermoplastic adhesive layers by a carbon dioxide ga laser after thermocompression bonding was performed by various linear pressures under the conditions of heating temperature of 130° C. and a feed speed of 30 cm/min. as Examples 14 to 27 and Controls 20 to 32. As is apparent from FIGS. 8 and 9, the decrement time of distribution of brightness and the half life of brightness of the AC powder type EL panel manufactured within the linear pressure range of 5 to 40 kg/cm were 3,000 to 3,500 hours, while the decrement time of distribution of brightness and the half life of brightness were 2,000 hours under the conditions of the linear pressure of 4 kg/cm or less and more than 40 kg/cm.

When the heating temperature and the linear pressure are increased, it is difficult to uniformly perform thermocompression bonding since flowability of the thermoplastic adhesive is largely increased. When the thickness ratio of the protective film to the thermoplastic adhesive layer has a distribution, a region in which the ratio of the two is very large partially appears. To contrary to this, when the heating temperature and the linear pressure are decreased, the flowability of the thermoplastic adhesive is decreased. Therefore, since the thermoplastic adhesive is not airtightly filled in edge and corner portions of the AC powder type EL element but produces bubbles, sealing of the AC powder type EL element becomes imperfect.

As described above, the AC powder type EL panel can be uniformly and airtightly sealed by performing thermocompression bonding under the conditions of preferably a heating temperature of 100° C. to 150° C. and a linear pressure of 5 to 40 kg/cm. By cutting the resultant panel by using a laser, the thermoplastic adhesive at the cut surface can be airtightly covered with the protective films to realize an AC powder type EL panel free from uneven deterioration.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An AC powder EL panel comprising:

an AC powder EL element including a first electrode, a reflective insulating layer formed on said first electrode, a light-emitting layer formed on said reflective insulating layer, a transparent second electrode provided on said light-emitting layer, and a pair of leads connected to said first and second electrodes;

a thermoplastic adhesive layer formed on substantially the entire surface of said AC powder EL element; and a pair of protective films adhered to cover substantially the entire surface of said thermoplastic adhesive layer and having end portions fused to each other using a laser to seal said AC powder EL element.

2. A panel according to claim 1, wherein a thickness ratio of said protective film to said thermoplastic adhesive layer is within the range of 5:1 to 2:1.

3. A panel according to claim 1, wherein the thickness of said protective film is 100 to 300 μm.

4. A panel according to claim 1, wherein a material of said thermoplastic adhesive is selected from the group consisting of an olefin resin, an acrylic resin, a vinyl acetate resin, and polyester.

5. A panel according to claim 1, wherein a material of said first electrode is selected from the group consisting of Al, Cu, Ni, alloy of Al and Cu, alloy of Al and Ni, alloy of Cu and Ni, an alloy of Al, Cu and Ni.

* * * * *